United States Patent
Otte et al.

(10) Patent No.: US 8,498,416 B2
(45) Date of Patent: Jul. 30, 2013

(54) VALIDATION OF STORED OR INCOMING MESSAGES

(75) Inventors: Kurt W. Otte, Boulder, CO (US); Ehren J. D. Van Melle, Longmont, CO (US)

(73) Assignee: QUALCOMM Incorporated, San Diego, CA (US)

( * ) Notice: Subject to any disclaimer, the term of this patent is extended or adjusted under 35 U.S.C. 154(b) by 1168 days.

(21) Appl. No.: 12/115,297

(22) Filed: May 5, 2008

(65) Prior Publication Data

US 2009/0274301 A1    Nov. 5, 2009

(51) Int. Cl.
*H04L 29/06* (2006.01)
(52) U.S. Cl.
USPC ........... 380/270; 380/278; 380/247; 455/427; 455/406; 375/136; 375/343; 375/345
(58) Field of Classification Search
USPC ................................. 380/270; 455/404.2, 427
See application file for complete search history.

(56) References Cited

U.S. PATENT DOCUMENTS

| | | | |
|---|---|---|---|
| 5,913,164 A * | 6/1999 | Pawa et al. | 455/427 |
| 6,253,326 B1 * | 6/2001 | Lincke et al. | 726/12 |
| 6,700,903 B1 | 3/2004 | Boyd et al. | |
| 7,023,899 B2 | 4/2006 | Das et al. | |
| 7,389,412 B2 * | 6/2008 | Sharma et al. | 713/153 |
| 7,522,689 B2 | 4/2009 | Haartsen | |
| 2004/0005020 A1 * | 1/2004 | Dent | 375/343 |
| 2004/0057499 A1 | 3/2004 | Haartsen | |
| 2004/0264701 A1 * | 12/2004 | Lee et al. | 380/270 |
| 2006/0177061 A1 * | 8/2006 | Orsini et al. | 380/268 |
| 2009/0150537 A1 * | 6/2009 | Fanson | 709/224 |

FOREIGN PATENT DOCUMENTS

| | | |
|---|---|---|
| CN | 1338156 A | 2/2002 |
| JP | 2002527939 | 8/2002 |
| JP | 2004046411 A | 2/2004 |
| JP | 2004519122 | 6/2004 |
| JP | 2006074819 A | 3/2006 |
| JP | 2008263629 A | 10/2008 |
| WO | WO0044117 A2 | 7/2000 |

OTHER PUBLICATIONS

"Wideband CDMA system"; Fukasawa et al, 1996 IEEE communication magazine, p. 244-248.*
International Search Report & Written Opinion—US2009/042825—International Search Authority—European Patent Office—Jun. 7, 2010.
Taiwan Search Report—TW098114910—TIPO—Jul. 11, 2012.

* cited by examiner

*Primary Examiner* — Taghi Arani
*Assistant Examiner* — Jason Lee
(74) *Attorney, Agent, or Firm* — Kevin Cheatham

(57) ABSTRACT

A mobile device can save time by validating a stored message, which was previously unreadable, by utilizing a related message, which can be received at a much quicker rate. In accordance with some aspects, the mobile device can save time by validating the stored message by reading a new related message and subsequently re-reading or descrambling the stored message or its CRC. The first attempt to read the message might not be successful due to a scrambling information change or due to other reasons. The reason for the failure of the first attempt to read the message may be determined based on whether a later attempt to read the message with the same or a different scrambling information is successful.

13 Claims, 14 Drawing Sheets

VALIDATION OF STORED OR INCOMING MESSAGES

BACKGROUND

I. Field

The following description relates generally to communication systems and more particularly to message validation.

II. Background

Wireless communication systems have become a prevalent means by which majority of people worldwide have come to communicate. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, orthogonal frequency division multiple access (OFDMA) systems, and other systems.

A typical wireless communication network (e.g., employing frequency, time, and code division techniques) includes one or more base stations that provide a coverage area and one or more mobile (e.g., wireless) terminals that can transmit and receive data within the coverage area. A typical base station can concurrently transmit multiple data streams for broadcast, multicast, and/or unicast services, wherein a data stream is a stream of data that can be of independent reception interest to a mobile terminal. A mobile terminal within the coverage area of that base station can be interested in receiving one, more than one, or all the data streams carried by the composite stream. Likewise, a mobile terminal can transmit data to the base station or another mobile terminal.

In conventional systems, when a mobile device listens to a wireless communication network (e.g., base station), some of the messages can take a relatively long time to download. During this time, battery power is wasted and performance issues, such as missed communications and systems losses, can be incurred.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with validating stored or incoming messages through utilization of related incoming and/or stored messages. The messages are linked, through signatures, hashes, or other linking techniques. If an attempt to read the message is unsuccessful, the message (or a portion of the message) is stored. The stored messages can be validated, at a later time, by reading subsequent messages, which can be received at a quicker rate. The storing of messages that are unreadable can mitigate the time spent re-downloading large messages, which can increase standby time and performance metrics, such as communication reception.

An aspect relates to a method for validating stored or incoming messages. The method includes determining that a message was not successfully read after a first attempt and retaining the message as unreadable. Scrambling information is obtained and an attempt to re-read the message with the obtained scrambling information is performed. The method further ascertains whether the message was not successfully read after the first attempt due to a scrambling information change or due to a reason different from a scrambling information change.

Another aspect relates to a wireless communications apparatus that includes a memory and a processor. The memory retains instructions related to determining that a message was not successfully read after a first attempt, retaining the message as unreadable, and obtaining a scrambling information. The memory also retains instructions relating to attempting to re-read the message with the obtained scrambling information and ascertaining whether the message was not successfully read after the first attempt due to a scrambling information change or due to a reason not related to the scrambling information change. The processor is coupled to the memory and configured to execute the instructions retained in the memory.

A further aspect relates to a wireless communications apparatus that facilitates validation of messages. The apparatus includes a means for determining that a message was not successfully read after a first attempt, a means for retaining the message as unreadable, and a means for obtaining scrambling information. The apparatus also includes a means for attempting to re-read the message with the obtained scrambling information and a means for ascertaining whether the message was not successfully read after the first attempt due to a scrambling information change or due to a reason different from the scrambling information change.

Yet another aspect relates to a machine-readable medium having stored thereon machine-executable instructions for validation of messages. The instructions include determining that a message was not successfully read after a first attempt, retaining the message as unreadable, and obtaining a scrambling information. The instructions also include attempting to re-read the message with the obtained scrambling information and ascertaining whether the message was not successfully read after the first attempt due to a scrambling information change or due to a reason different from the scrambling information change.

A further aspect relates to at least one processor for validating messages. The processor includes a first module operable to determine that a message was not successfully read after a first attempt and a second module operable to retain the message as unreadable. The processor also includes a third module operable to obtain scrambling information and a fourth module operable to attempt to re-read the message with the obtained scrambling information. The processor further includes a fifth module operable to determine whether the message was not successfully read after the first attempt due to a scrambling information change or due to a reason not related to the scrambling information change.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of the various aspects may be employed. Other advantages and novel features will become apparent from the following detailed description when considered in conjunction with the drawings and the disclosed aspects are intended to include all such aspects and their equivalents.

DETAILED DESCRIPTION

Figure 1:
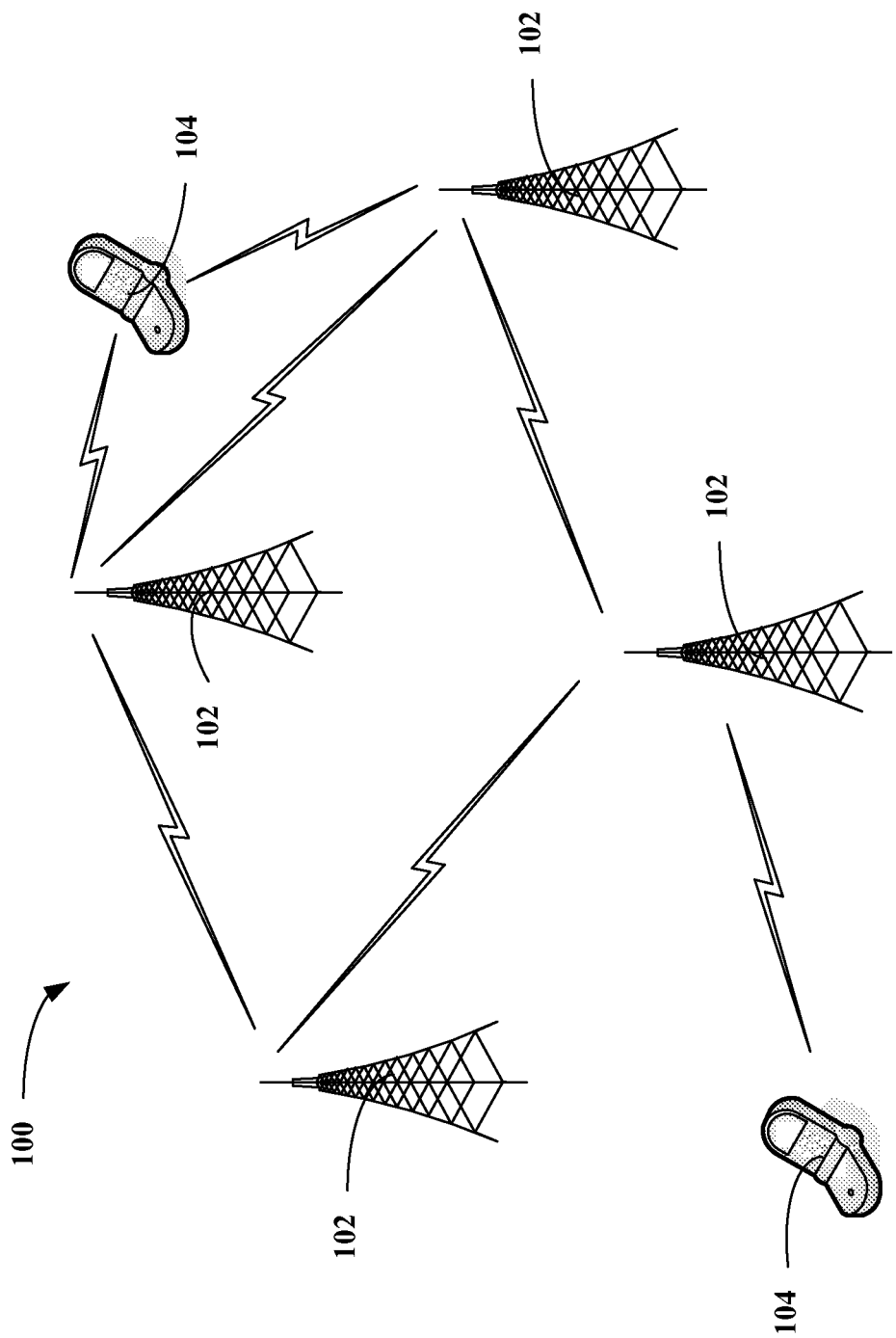
FIG. 1 illustrates a wireless communication system in accordance with various aspects presented herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal. A wireless terminal can also be called a system, subscriber unit, subscriber station, mobile station, mobile, mobile device, device remote station, remote terminal, access terminal, user terminal, terminal, wireless communication device, user agent, user device, or user equipment (UE). A wireless terminal may be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, and/or another processing device for communicating over a wireless system. Moreover, various aspects are described herein in connection with a base station. A base station may be utilized for communicating with wireless terminal(s) and may also be referred to as an access point, Node B, or some other terminology.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to FIG. 1, a wireless communication system 100 in accordance with various aspects presented herein is illustrated. System 100 can comprise one or more base stations 102 in one or more sectors that receive, transmit, repeat, and so forth, wireless communication signals to each other and/or to one or more mobile devices 104. Each base station 102 can comprise multiple transmitter chains and receiver chains (e.g., one for each transmit and receive antenna), each of which can in turn comprise a plurality of components associated with signal transmission and reception (e.g., processors, modulators, multiplexers, demodulators, demultiplexers, antennas, and so forth). Each mobile device 104 can comprise one or more transmitter chains and receiver chains, which can be utilized for a multiple input multiple output (MIMO) system. Each transmitter and receiver chain can comprise a plurality of components associated with signal transmission and reception (e.g., processors, modulators, multiplexers, demodulators, demultiplexers, antennas, an so on), as will be appreciated by one skilled in the art.

A base station 102 can convey initial information to the mobile devices through over the air messages. In wireless communication systems that link these over the air messages, another over the air message can assist with validating and/or invalidating messages that were previously unreadable and, therefore, stored. In accordance with the disclosed aspects, the mobile device 104 is capable of re-using stored messages in this manner and, thus, battery power and life can be extended. Additionally or alternatively, time can be saved because the need to decode additional messages can be mitigated. Further information relating to using messages to validate other messages according to the disclosed aspects will be provided below.

Figure 2:
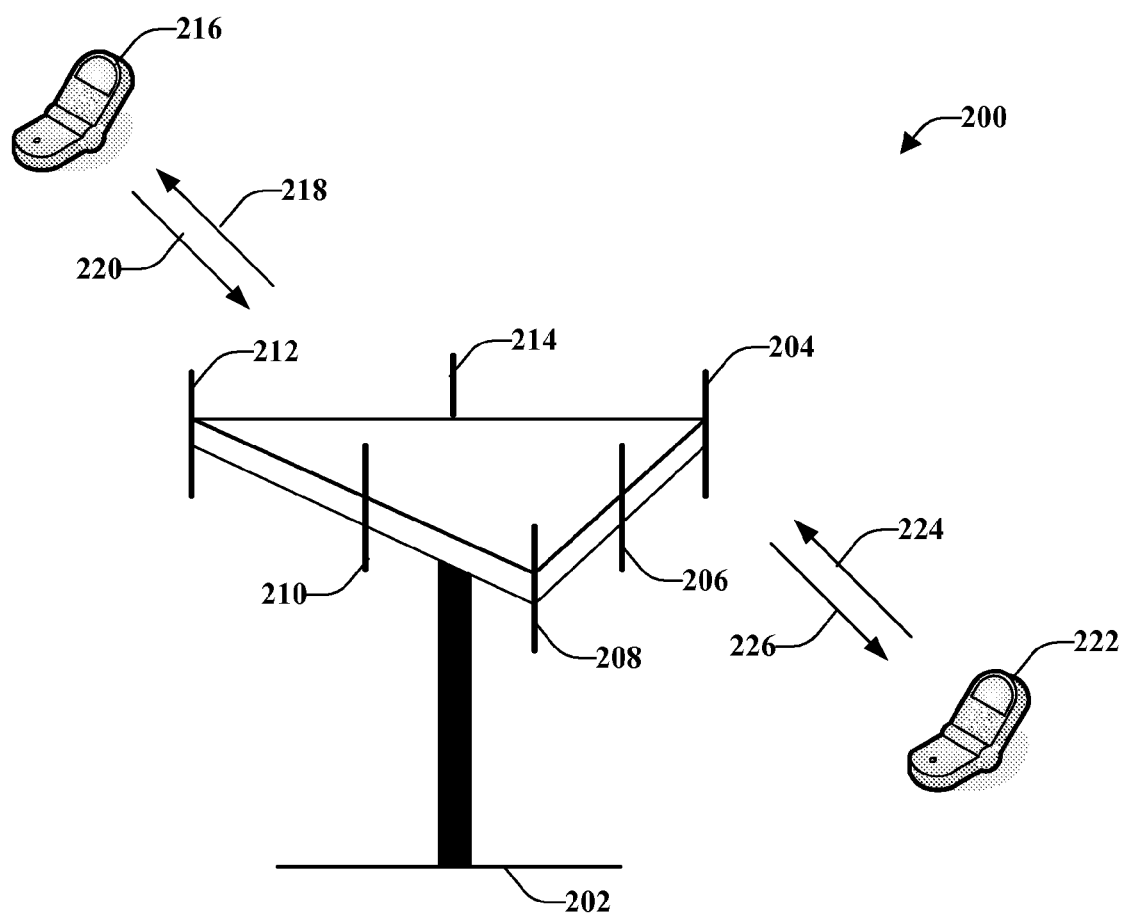
FIG. 2 illustrates a multiple access wireless communication system according to one or more aspects.

Referring now to FIG. 2, a multiple access wireless communication system 200 according to one or more aspects is illustrated. A wireless communication system 200 can include one or more base stations in contact with one or more user devices. Each base station provides coverage for a plurality of sectors. A three-sector base station 202 includes multiple antenna groups, one including antennas 204 and 206, another including antennas 208 and 210, and a third including antennas 212 and 214. According to the figure, only two antennas are shown for each antenna group, however, more or fewer antennas may be utilized for each antenna group. Mobile device 216 is in communication with antennas 212 and 214, where antennas 212 and 214 transmit information to mobile device 216 over forward link 220 and receive information from mobile device 216 over reverse link 218.

Forward link (or downlink) refers to the communication link from the base stations to mobile devices, and the reverse link (or uplink) refers to the communication link from mobile devices to the base stations. Mobile device 222 is in communication with antennas 204 and 206, where antennas 204 and 206 transmit information to mobile device 222 over forward link 226 and receive information from mobile device 222 over reverse link 224.

Each group of antennas and/or the area in which they are designated to communicate may be referred to as a sector of base station 202. In one or more aspects, antenna groups each are designed to communicate to mobile devices in a sector or the areas covered by base station 202. A base station may be a fixed station used for communicating with the terminals.

In a conventional wireless communication system, a mobile device spends a large amount of time in idle mode monitoring messages. The mobile device can monitor pages and over time might determine that the messages are invalid (e.g., unreadable), thus the device will collect all the messages again. The messages can be sent according to a fixed schedule. If it is possible that a current message is out-of-date or otherwise invalid (e.g., unreadable), the device will typically wait to download the entire message again and takes the time to decode the full message, which can waste resources.

The one or more disclosed aspects presented herein can allow the mobile device to save time by validating a stored message by decoding a related message, which can be received at a much quicker rate. In accordance with some aspects, the mobile device can save time by validating a previously unreadable message (that was retained in a storage media) by decoding a new related message and subsequently re-reading the stored message or its CRC (cyclic redundancy check). One or more of the disclosed aspects allow the stored message (or its CRC) be re-read by quickly updating the messages that could affect the stored message (or its CRC) through a scramble or signature match.

Figure 3:
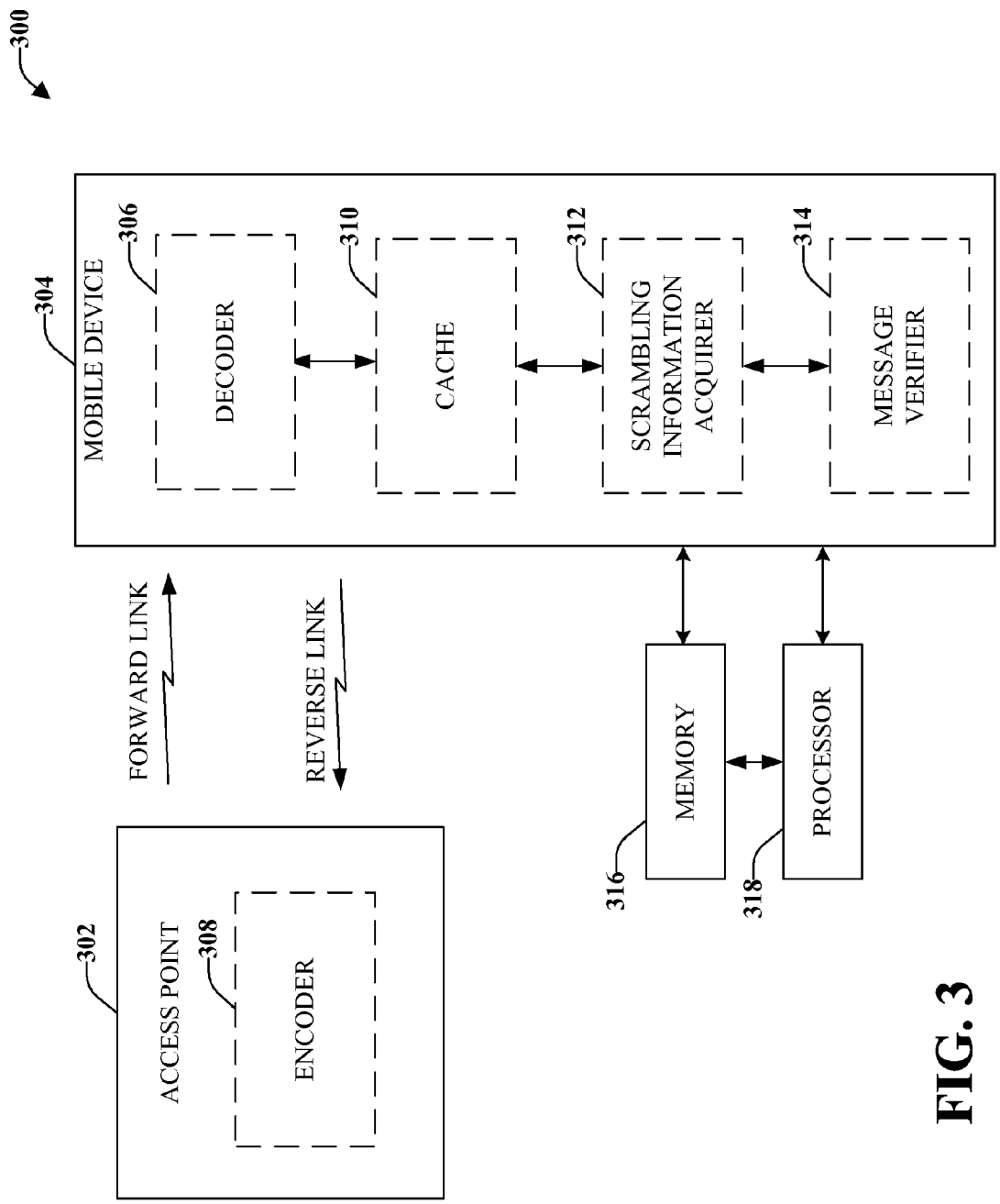
FIG. 3 illustrates a system that validates stored or incoming messages with related incoming or stored messages.

FIG. 3 illustrates a system 300 that validates stored or incoming messages with related incoming or stored messages. In a wireless communication system, a sender encodes a message, which is decoded or read at a receiver. If the receiver is not able to read a message, it could indicate that a scrambling (e.g., encoding) of the message has changed. If the scrambling of the message changed, the receiver needs to receive the new scrambling information in order to successfully decode the message. However, unsuccessful decoding might also be a result of another reason, such as environmental fading effects within the network or other communication failure reasons (e.g., jamming). Scrambling information change and other reasons for unsuccessful decoding can appear as noise, therefore, it can be difficult in traditional systems to distinguish the cause of the unsuccessful decode. System 300 can be configured to determine whether an unsuccessful decoding was a result of a scrambling information change or a reason different from a scrambling information change. Further, system 300 can provide time savings by validating a stored message by decoding a related message, which can be downloaded at a quicker rate.

System 300 includes an access point 302 that is in communication with a mobile device 304. Although a number of access points 302 and mobile devices 304 can be included in system 300, as will be appreciated, a single access point 302 that is in communication with a single mobile device 304 is illustrated for purposes of simplicity.

The communication between access point 302 and mobile device 304 can be wireless or over the air. Some of the over the air messages between the access point 302 and the mobile device 304 can be sent frequently. Such messages inform the mobile device 304 about parameters or settings that can change quickly. Other over the air messages can be sent infrequently because the information contained in these messages can be relatively constant. Such information in these infrequent messages can include information about the network (e.g., access point 302) identification, the type of network and how to access it, parameters to utilize during mobile device operation on the network, parameters specific to certain sectors of the network, as well as other information.

A procedure for providing the mobile device 304 a sense of confidence in the messages received is to embed information about some of the messages in each other. An example of this is a hierarchy scheme in which message "A" would have information about itself embedded in message "B", and message "B" would have information about itself embedded in message "C", and so forth. The embedded information can be performed in a number of ways, including a matched signature in both messages or scrambling of a CRC of each message using signatures or hashes of other messages, as well as other techniques. Further detailed information relating to linking of messages will be provided below with reference to FIG. 4 and FIG. 5.

In order to determine whether a received message could not be read as a result of a signature information change or another reason (e.g., environmental fading effects, jamming, the entire message was not received, and so forth), the mobile device 304 can include a decoder 306 that can be configured to decode or read a previously encoded message, which could have been encoded by an encoder 308 of base station 302. Encoder 308 can modulate and/or encode signals in accordance with a suitable wireless communication protocol (e.g., OFDM, OFDMA, CDMA, TDMA, GSM, HSDPA, . . . ), which signals can then be transmitted to mobile device 304. Encoder 308 can be a voice coder (vocoder) that utilizes a speech analyzer to convert analog waveforms into digital signals or another type of encoder.

Upon successfully reading a message by decoder 306, an acknowledgment (ACK) can be generated. The ACK indicates a successful receipt of the message and can be sent to base station 304 so that base station 304 is aware that the message was received and decoded or read, and therefore need not be retransmitted. In accordance with some aspects, a negative acknowledgment (NACK) can be generated and sent if there was not a successful receipt of the message. The NACK can be sent to the base station 302 to inform base station 302 that the message was successfully received (e.g., read) by mobile device 304. Thus, base station 302 can retransmit the message, or a portion thereof, if further communication of the message is to be transmitted.

If a message is not successfully decoded (resulting in a NACK) as determined by decoder 306, the entire unreadable message or bits from messages that were not successfully read can be retained in a cache 310. The cache 310 can be any type of storage media or memory, as will be described in further detail below. For example purposes and not limitation, a quick page message can be stored in cache 310. The quick page message, which was not successfully read, can be assumed to be valid but the message utilized to scramble or signature match with the quick page message (or its CRC) is assumed to be invalid.

Also included in mobile device 304 is a scrambling information acquirer 312 that can be configured to obtain scrambling information. The scrambling information can be derived utilizing various technologies such as algorithms, hash algorithms, or other methods (e.g., utilizing cryptology keys). The scrambling information obtained can be the same scrambling information that might have been previously received (and utilized to read the unreadable messages) or it can be different scrambling information (e.g., the scrambling information changed).

In accordance with some aspects, the scrambling information acquirer 312 can obtain a Quick Channel Information (QuickChannelInfo) (QCI) Message, wherein the retained unreadable message is a quick page message and the quick page message is considered valid and a message (e.g., such as an overhead message) used to scramble the quick page message is invalid. According to some aspects, this QCI message can be received in a first portion of a subsequent superframe.

Decoder 306 can attempt to re-read the previously unreadable message or bits retained in cache 310 utilizing the newly obtained scrambling information. In accordance with some aspects, the scrambling information is obtained from one source and the retained unreadable message is a different source.

A message verifier 314 can be configured to ascertain whether the previously unreadable message was not successfully read previously (before the newly obtained scrambling information) because of a scrambling information change or due to a reason not related to the scrambling information change (e.g., environmental fading effects, jamming, and so forth). Message verifier 314 can determine that, if the messages retained in the cache 310 can be successfully read by utilizing the obtained scrambling information (e.g., different scrambling information), it indicates that the read attempt failed because the scrambling information changed. Further, message verifier 314 can ascertain that the message was not previously read successfully due to a reason other than a signature information change if an attempt to re-read the message succeeds with original scrambling information (e.g., the same scrambling information utilized for the first read attempt).

In accordance with some aspects, the message verifier 314 can be configured to validate a stored quick page message by utilizing QCI Message information to descramble a saved quick page CRC. However, it should be understood that the disclosed aspects are not limited to a type of message, a message naming convention, nor a type of communication system.

Attempting to re-read the saved, previously unreadable messages, can mitigate obtaining and attempting to read more messages than is necessary, which can save battery life and other resources. Further, if the unreadable message or bits of the message that were unreadable are saved in the cache 310, resources and time can be saved because the entire messages do not have to be once again be retrieved from the access point 302 (or other sender of the messages).

System 300 can include memory 316 operatively coupled to mobile device 304. Memory 316 can be external to mobile device 304 or can reside within mobile device 304. Memory 316 can store information related to determining that a packet was not successfully read after at least a first attempt, storing the unreadable message, receiving a scrambling information, attempting to re-read the message with the received scrambling information, and determining whether the message was unreadable after the first attempt due to a change in the scrambling information or due to another reason(s). A processor 318 can be operatively connected to mobile device 304 (and/or memory 316) to facilitate analysis of information related to validation of stored or incoming messages in a communication network. Processor 318 can be a processor dedicated to analyzing and/or generating information received by mobile device 304, a processor that controls one or more components of system 300, and/or a processor that both analyzes and generates information received by mobile device 304 and controls one or more components of system 300.

Memory 316 can store protocols associated with validating stored and/or incoming messages, taking action to control communication between mobile device 304 and access point 302, and other functions, such that system 300 can employ stored protocols and/or algorithms to achieve improved communications in a wireless network as described herein. In accordance with some aspects, memory 316 can include or be associated with the cache 310, as discussed above.

It should be appreciated that the data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (DRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 316 of the disclosed aspects are intended to comprise, without being limited to, these and other suitable types of memory.

Figure 4:
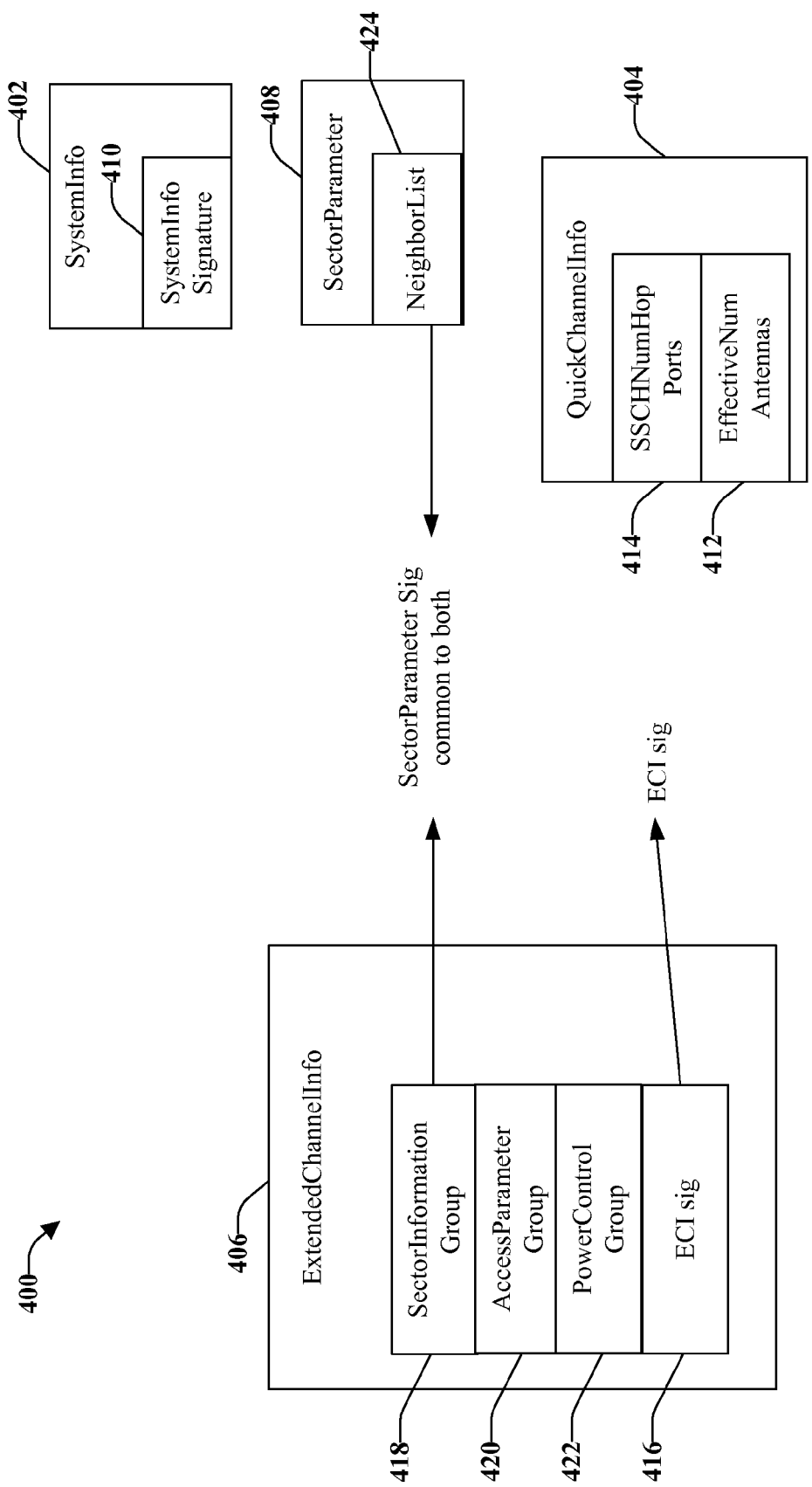
FIG. 4 illustrates an example of a structure of messages that are linked together.

In order to fully appreciate the disclosed aspects, FIG. 4 illustrates an example of a structure of messages 400 that are linked together. It should be understood that the various examples provided herein may relate to a specific implementation in order to describe the various aspects, however, the disclosed aspects are not limited to the specific implementations herein described. Additionally, the examples of linking of these messages is not limited to the types of messages nor the manner in which they are linked as shown and described herein. In accordance with the disclosed aspects, the linking of messages provides that one message can be utilized to determine the validity of other messages that have previously been received.

The figure illustrates how a System Information (SystemInfo) Message 402, a Quick Channel Information (QuickChannelInfo) (QCI) Message 404, an Extended Channel Information (ExtendedChannelInfo) (ECI) Message 406, and a Sector Parameters Message 408 can be linked together by various signatures, scrambling, hashes, or through other means. It should be understood that the messages that utilize the disclosed aspects can be different message that perform other functions or messages that perform similar functions as those illustrated but can be referred to with different terminology.

The SystemInfo Message 402 can be transmitted in a Forward-Primary BroadCast Channel (F-PBCCH) of a superframe preamble or every superframe. For example, the F-PBCCH can be an OFDM symbol number "0" of the superframe preamble. In accordance with some aspects, it can take about sixteen superframes to transmit the entire SystemInfo Message 402. The start of the message can be in a superframe where SFIndex mod 16=0. SystemInfo Message 402 can have a SystemInfo signature field 410, which can be an assigned number.

The QuickChannelInfo (QCI) Message 404 can be transmitted in alternate superframes in a Forward—Secondary BroadCast Channel (F-SBCCH) of the superframe preamble. For example, the F-SBCCH can be in OFDM symbols numbers 1 through 4 of the superframe preamble. In synchronous mode, the QCI Message 404 can be transmitted in superframes with an even value of PilotPhase. In asynchronous mode, QCI Message 404 can be transmitted in superframes with an even value of SuperFrameIndex. The CRC of the QCI Message 404 can be scrambled by the SystemInfo Signature 410. The QCI Message 404 can include the Effective Number of Antennas 412 and the SSCH Number HopPorts 414, as well as other information.

The ECI Message 406 can be transmitted in PHY frames in Forward Traffic Channel MAC with BroadcastMacID. In accordance with some aspects, the ECI Message 406 can be re-transmitted about every eight superframes. Fields included in the ECI Message 406 include a SectorParameter signature and an ECI signature field 416, which can be an assigned value. Also included can be a SectorInformation Group 418, an AccessParameterGroup 420, a PowerControlGroup 422, as well as other information.

The SectorParameters Message 408 can be transmitted in PHY frames in Forward Traffic Channel MAC with Broadcast MacID. The SectorParameters Message 408 can be transmitted approximately every sixty-four superframes. A SectorParameters signature field, which can have an assigned value, is included in the SectorParameters Message 408. The SectorParameters signature field of the ECI Message 406 and the SectorParameters Message 408 can be common. The SectorParameter Message 408 can include a Neighbor List 424 and other information.

Figure 5:
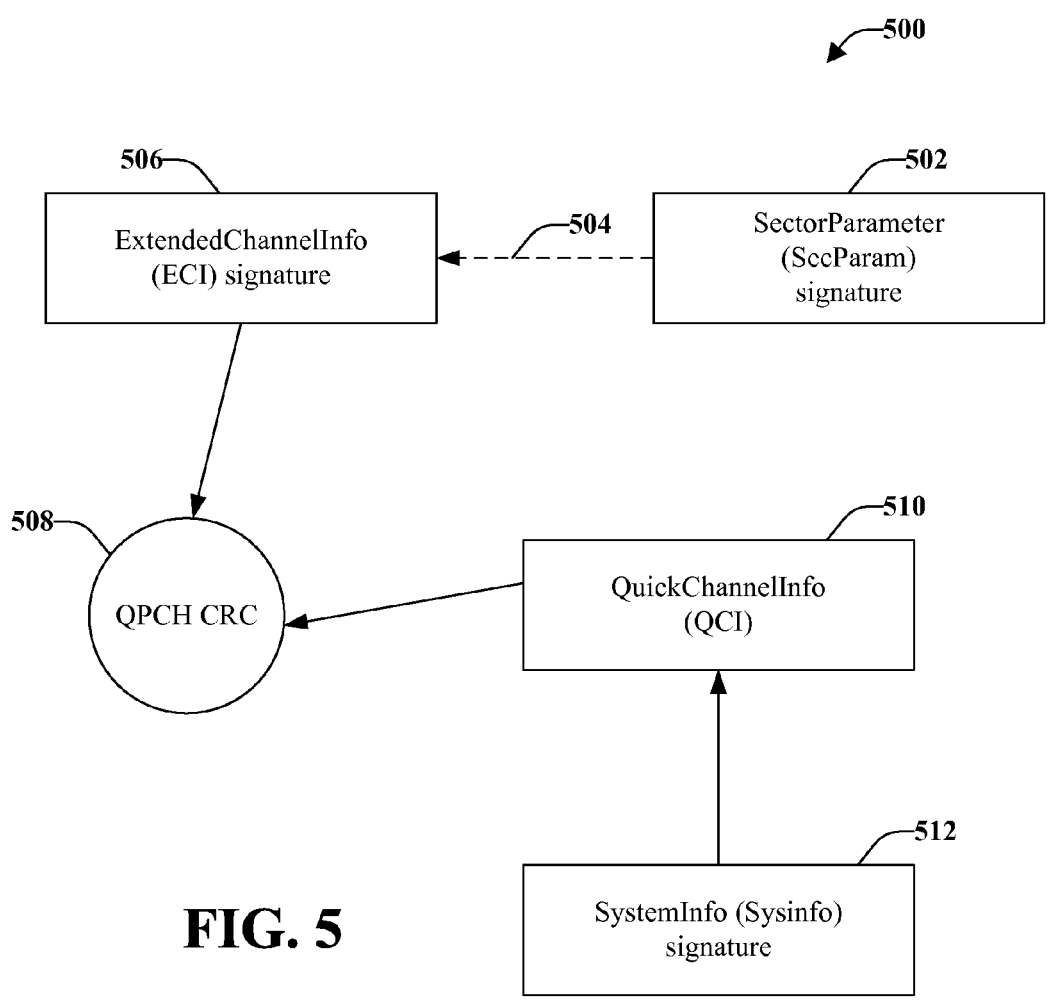
FIG. 5 illustrates an example schematic representation of linking between overhead messages and a Quick Paging Channel (QPCH).

FIG. 5 illustrates an example schematic representation 500 of linking or connection between overhead messages and a Quick Paging Channel (QPCH). It should be understood that the messages shown and described are for example purposes and the aspects are not limited to these channels. As illustrated, the Sector Parameter (SecParam) message can include a signature 502. A signature is an identifier that specifies the contents of a message. For example, the signature can be a unique number. The signature can be derived from a formula, algorithm, hashing algorithm, or other technique for deriving an identifier that corresponds to a message.

The SecParam signature 502 can be included in the payload information of an ExtendedChannelInfo (ECI) message (e.g., ECI block), as shown at arrow 504. The ECI message also includes a signature 506. When the ECI message is decoded, the signature 506 is checked and, if it matches the signature for the SecParam message that is stored in memory or cache, it is valid. It is inferred that it is valid because the signature should guarantee its uniqueness. If the ECI message and the signature are different than the one retained in cache, the information in the cache is invalid and another message should be retrieved.

A hash algorithm can be applied to the ECI message and the CRC can be scrambled, which is the scrambling of a QPCH message 508. The CRC can also be scrambled with quick channel information (QuickChannelInfo) (QCI) 510. A system information (SystemInfo) (SysInfo) message (and its signature 512) and the QCI 510 have a relationship similar to that of the SecParam 502 and the ECI 506. The QCI can include a field, which can include the signature for the SysInfo 512. The QPCH CRC 508 is scrambled with the ECI signature 506 and a hash of the QCI 510.

At substantially the same time as the QPCH message is received at a device it is decoded and verified against its CRC to determine if it was read correctly. The CRC fails if the ECI 506 and/or the QCI 510 changed. However, all the bits could have been decoded correctly and the only error was that the CRC is the incorrect CRC because it is scrambled.

For example, the device retrieves the QCI message and realizes that it changed. The device then verifies the QPCH CRC 508. A verification can indicate that the ECI message is correct and the Sector Parameters message for it is correct. When the QCI message is retrieved and it did not change anything with the system information message, it indicates that the systems information message is correct. Thus by simply checking one message, the mobile device is able to decode the QPCH message by descrambling the CRC and is able to validate the entire chain. This results in a savings because the ECI messages are expensive in that these message take a long time to transmit/receive over the air and it is a large message that is sent infrequently. However, the QCI messages are less expensive, shorter, and can be sent every other superframe (e.g., every 15 msec). Thus, a standby time savings can be realized by checking the CQI, revalidating the CPCH and retaining the ECI message in all cases except where it changes. By being able to decode the QPCH successfully, it can be inferred that the sector parameters information did not change either.

In accordance with the disclosed aspects, linking the messages in such detail provides that one message can ultimately be utilized to determine a validity of other messages that have previously been collected. In an Ultra Mobile Broadband (UMB) case, for example, if the signature embedded in a newly received ECI does not match a signature in a previously collected SecParams, then it might be concluded that the SecParams has changed and should be updated. Similarly, if the QCI CRC cannot be descrambled, it can be concluded that the SysInfo signature has changed and the SysInfo should be updated.

Meanwhile, a QPCH error can indicate a number of possibilities. One possibility is that the received signal strength might have been bad at the time the QPCH was received at the mobile device and there were not enough received bits to decode the message properly. Another possibility is that the ECI message has changed and, therefore, the ECI signature utilized to scramble the QPCH CRC is incorrect. Another possibility is that the QCI message has changed and, therefore, the hash of the QCI utilized to scramble the QPCH CRC is incorrect. This last possibility will be utilized below to describe how the information can be utilized to increase a standby time of a mobile device. In a further possibility, a mobile device (such as a UMB mobile device) might be able to utilize the ability to successfully descramble a QCI CRC as a validation of a cached SysInfo Message, which will be described with reference to FIG. 8 below.

Figure 6:
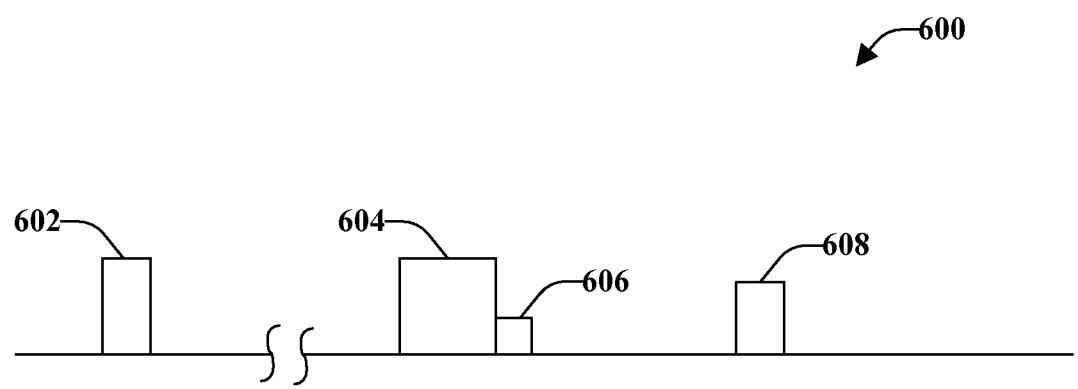
FIG. 6 illustrates a schematic representation of receiving an error on a Quick Page decode and updating the messages and subsequently re-decoding the same bits correctly.

With reference now to FIG. 6 illustrated is a Generic Quick Page (QP) Re-Decode 600. In a generic case of the QP being decoded in error, there are a variety of options available to the mobile device, depending on the type of system being utilized. An option can be to decode a second QP bit. Another option that can be utilized is to ignore the QP information completely and proceed to decode the Fast Page (FP) directly to check for an incoming page. A further option is to store the raw QP data bits and then update any overhead messages that may have changed and resulted in the QP error. If the overall impact to the mobile device's standby time is favorable, it can increase the standby time.

FIG. 6 illustrates a schematic representation 600 of receiving an error on a QP decode and then updating the overhead messages and subsequently re-decoding the same bits correctly. The schematic representation 600 is for a generic QP re-decode. The decode of the QP data is illustrated, at 602. The raw data can be stored in a storage media, such as memory (or cache), upon decode or a CRC failure. At 604, additional overhead messages can be decoded. These messages can be utilized, at 606, where the QP data that was stored is re-decoded or its CRC is checked with new information gained, at 604. At 608, the FP can be decoded if the QP re-decode was not enabled, indicated a page, or failed again.

Figure 7:
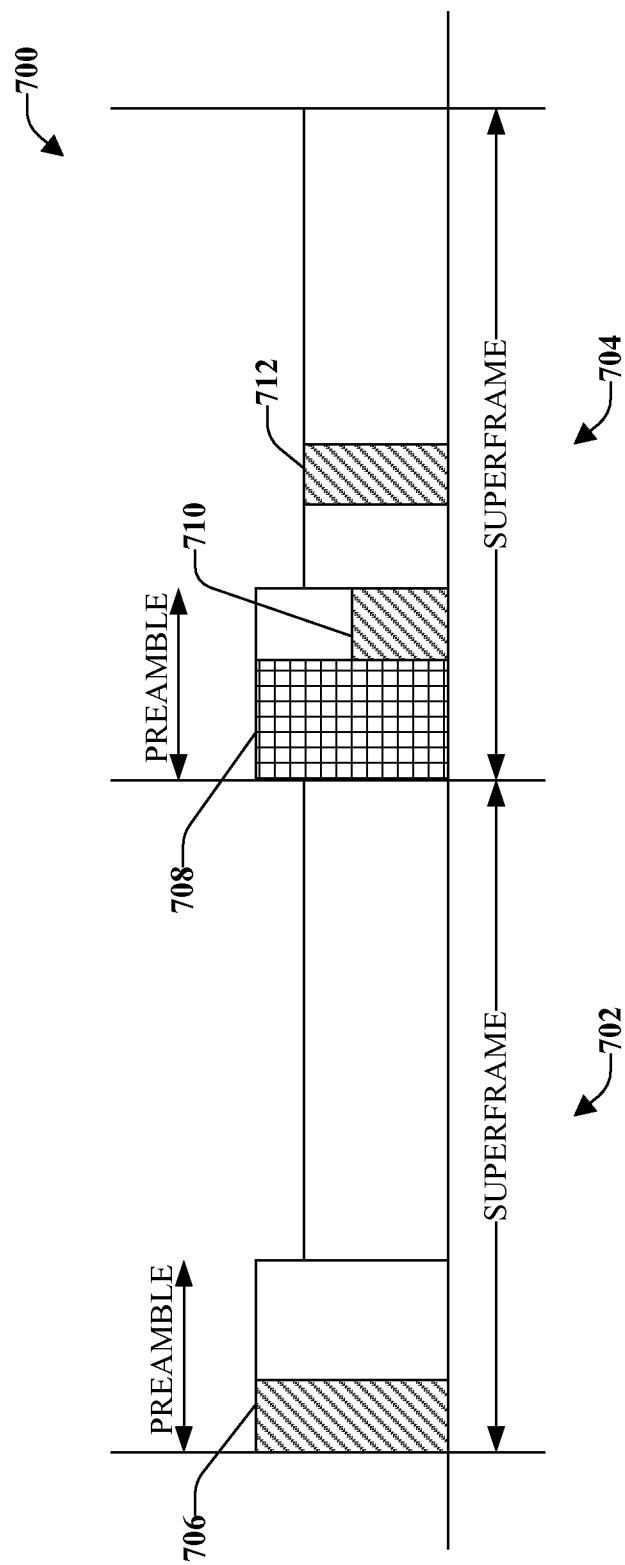
FIG. 7 illustrates details of a time line for a UMB system, although other systems can be utilized with the disclosed techniques.

FIG. 7 illustrates details of a time line 700 for a UMB system, although other systems can be utilized with the disclosed techniques. As illustrated, QPC and QCI messages are sent in alternating superframes 702 and 704. These superframes 702 and 704, in accordance with some aspects, can each be approximately 20 msec in length. Both the QPC and QCI can be sent in a preamble portion of the superframe, which can entail approximately the first msec of the superframe. The preamble can also contain information that the mobile device utilizes to update the timing of the mobile device and to determine which sectors should be utilized for receiving data from an access point. Thus, the mobile device can process the preamble for a superframe of interest. In the example UMB system, the FP can occur in the superframe immediately following the superframe with the QPCH. Thus updating the QCI message might not incur additional loss of standby time for the mobile device.

As illustrated, at 704, the QP data in the superframe preamble is decoded. The data can be stored if the CRC check fails. At 709, the QCI message is decoded in the next superframe preamble. The message can be decoded here because the mobile device is already awake for this superframe preamble. At 710, the QPCH CRC can be re-checked based on the hash of the new QCI. The mobile device does not have to decode the FP if "no page" is determined. The FP can be decoded, at 712, if necessary. By updating the QCI and subsequently being able to possibly validate the QPCH CRC, the mobile device does not need to be powered on to receive the FP, if the QPCH result indicated "no page." This can result in a power savings for the mobile device and an increase in standby time.

Figure 8:
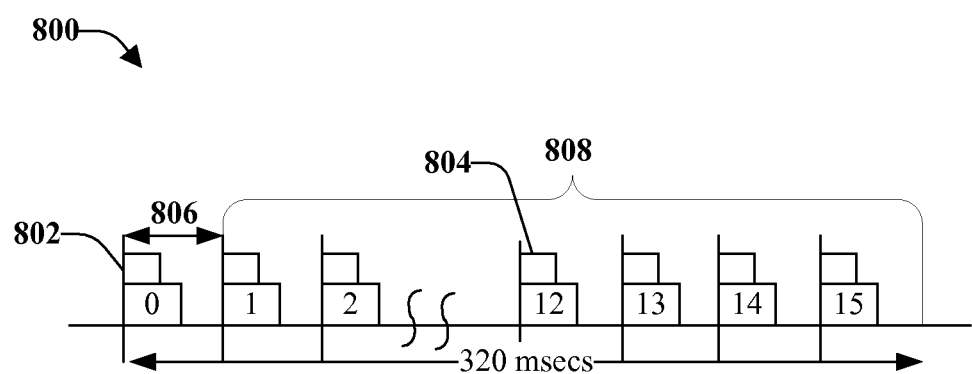
FIG. 8 illustrates an example of potential time savings realized by utilizing cached System Information in accordance with one or more of the disclosed aspects.

FIG. 8 illustrates an example of time savings 800 utilizing cached SysInfo in accordance with one or more of the disclosed aspects. When an access terminal initially finds a sector to acquire the access node, the SysInfo message can be the first message sought. The SysInfo message can be sent in portions across about sixteen superframes, illustrated as superframes 0, 1, 2, through 15. The QCI message can be sent in its entirety in each superframe. A few QCI messages are labeled at 802 and 804. In this example, each superframe can take about 20 msecs, which is illustrated by arrow 806. It can take approximately 320 msecs for the entire message to be received, in one example. By utilizing a cached SysInfo message from a previous access node connection, the access terminal can directly attempt to decode the QCI and utilize the stored SysInfo's signature to descramble the QCI CRC. If the CRC passes, the SysInfo message stored in cache is validated and does not need to be recollected. Since the QCI can be completely decoded in any superframe, the access terminal can reach the idle state about 300 msec sooner and can save, in this example, fifteen additional superframe wakeups of batter power. Thus, about 300 msec, illustrated at 808, can be saved by using cached SysInfo. However, it should be understood that this time savings 800 is for illustrative purposes to show a few of the advantages of the disclosed aspects and various systems can realize less or more savings.

In view of the exemplary systems shown and described above, methodologies that may be implemented in accordance with the disclosed subject matter, will be better appreciated with reference to the following flow charts. While, for purposes of simplicity of explanation, the methodologies are shown and described as a series of blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 9:
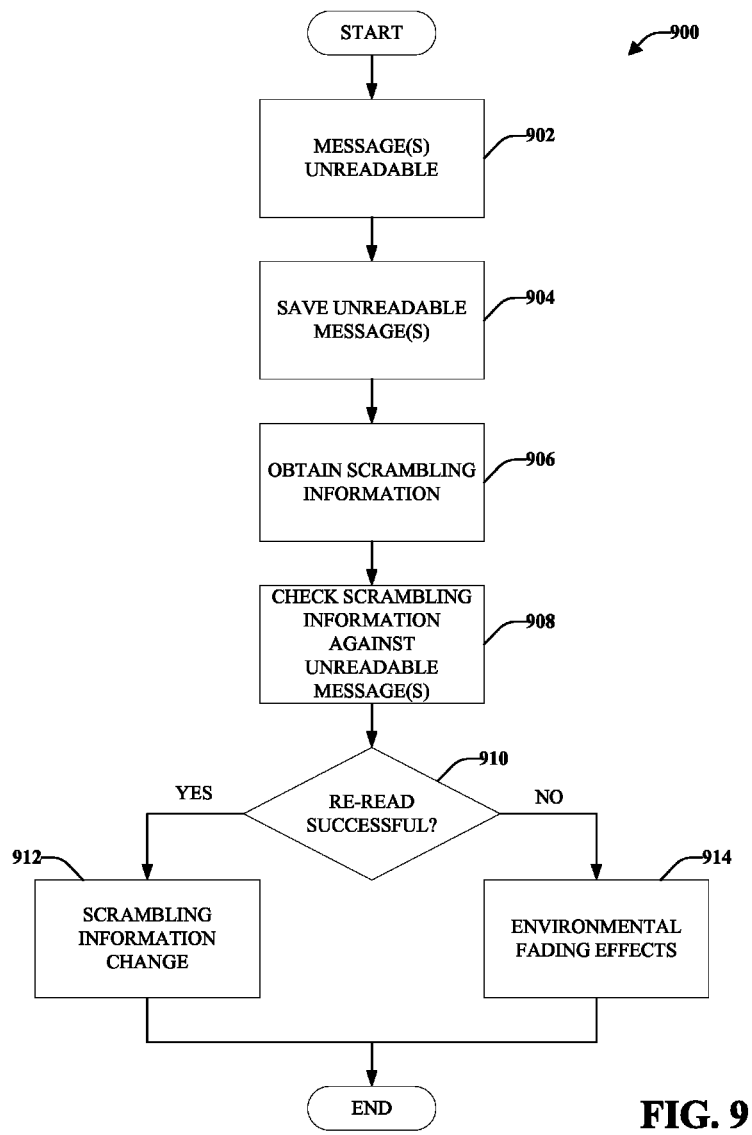
FIG. 9 illustrates a method for validating stored and/or incoming messages.

FIG. 9 illustrates a method 900 for validating stored and/or incoming messages. Method 900 can be utilized in a wireless communication environment in order to more efficiently make a determination whether messages were not read successfully due to a scrambling information change or due to another reason, since these problems might appear similar because the packets could not be successfully read.

For example, in a wireless communication environment there can be devices that are on the fringe of the geographic area or cell served by a serving base station. In fringe type environments there can be a large amount of fading occurring due to the nature of such environments. Instead of needing to constantly obtain message to determine that a message previously received was correct (e.g., no scrambling information change), method 900 can allow a device to backup and revalidate messages quicker, which can save standby time in harsh fading environments.

Method 900 begins at 902, when a message is not successfully read due to an unknown reason (e.g., scrambling information change, jamming, environmental fading effects, and so forth). The unreadable message can be retained, at 904, in a storage media, such as a cache or memory. Saving the unreadable message can mitigate the amount of time and resources necessary to retrieve the entire message at a later time. At 906, scrambling information is obtained. This scrambling information can be received infrequency or it might take longer to download than other types of information. This scrambling information is applied to one or more of the retained previously unreadable messages, at 908 with an attempt to re-read the message.

A determination is made, at 910, whether the attempt to re-read the previously unreadable message with the newly obtained scrambling information (e.g., different scrambling information) was successful. If the decode attempt was successful ("YES") with the newly obtained scrambling information it can indicate, at 912, that the scrambling information was changed for the previously non-decoded packets. If the decode attempt was not successful ("NO"), it can indicate, at 914, that the scrambling information was not a factor that caused the unsuccessful read attempt (e.g., both the old and the most recently obtained scrambling information was not able to decode the packet). In this situation, the unsuccessful read attempt might have been caused by environmental fading effects or other communication problems. Another attempt to re-read the message with the original scrambling information (e.g. the information utilized for the first read attempt) can be conducted. If the attempt to re-read the message with the original signature information (e.g., signature information utilized to read the message during the first attempt) is successfully, it indicates failure due to a reason other than a signature information change.

Figure 10:
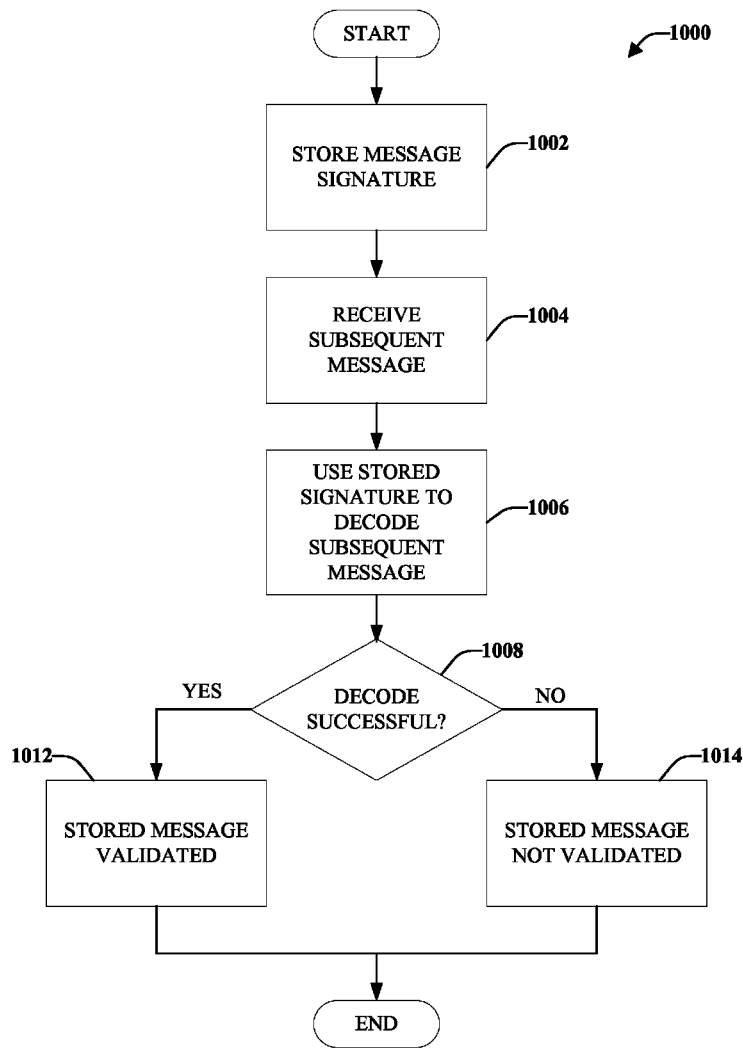
FIG. 10 illustrates a method for validating stored messages by utilization of related incoming messages.

FIG. 10 illustrates a method 1000 for validating stored messages by related incoming messages. When a mobile device listens to a wireless communications network, some of the messages may take a relatively long time to download. When messages are linked through signatures, hashes, or other methods, the stored messages can be validated by decoding subsequent messages, which might be received at a quicker rate. Thus, method 1000 can mitigate the time spent downloading larger messages, which can result in an increased standby time and increased performance metrics, such as call reception.

For example purposes and not limitation, in a UMB system, a QCI message can be gathered within a maximum of about 40 msecs and, if decode correctly with a stored System Info message, can save approximately 320 msecs of time to gather a new System Info message.

Method 1000 starts, at 1002, when an message's signature is stored. In accordance with some aspects, something other than the signature is stored, depending on what is applicable to a given system. A subsequent message is received at 1004. This subsequent message might be received much quicker than other messages. At 1006, the stored message's signature is utilized to decode the received message. A determination is made, at 1008, whether the decode was successful. If the decode is successful ("YES") the decode validates the stored message, at 1012. If the decode is not successful ("NO"), at 1014, the stored message cannot be validated and a newer message might need to be obtained.

Figure 11:
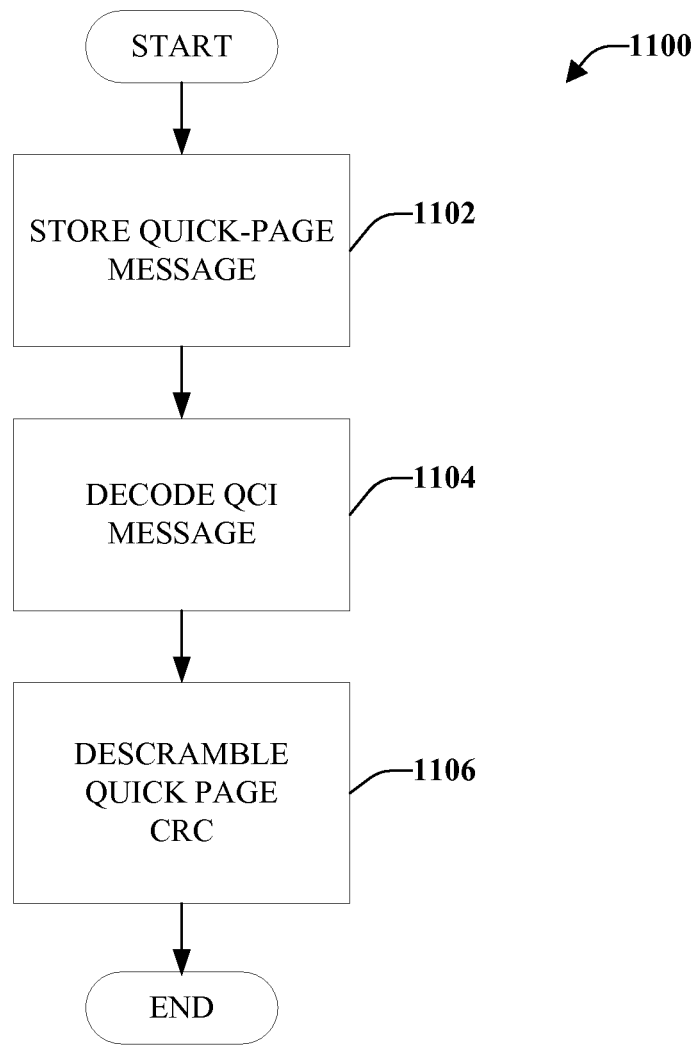
FIG. 11 illustrates a method for validation of quick page messages by decoding a new related message.

FIG. 11 illustrates a method 1100 for validation of quick page messages by decoding a new related overhead message. It should be understood that that the method and messages discussed with reference to this figure are for purposes of understanding and not limitation. Method starts at 1102 when a quick page message is stored. This stored quick page message is assumed to be valid, however, the overhead message which was used to scramble or signature match with the quick page (or its CRC) is assumed to be invalid. This overhead can be updated while mitigating the amount of additional resources utilized by receiving a next superframe (in a UMB system) and decoding the QCI message, at 1104. The quick page CRC can be descrambled, at 1106, with this new information. Since the mobile device listens to this part of the superframe where the QCI occurs (the full page occurs later in the same superframe), thus mitigating additional cost to the mobile device. Thus, method 1100 allows the stored quick page to be re-checked, potentially saving a subsequent decode of the full page message.

Figure 12:
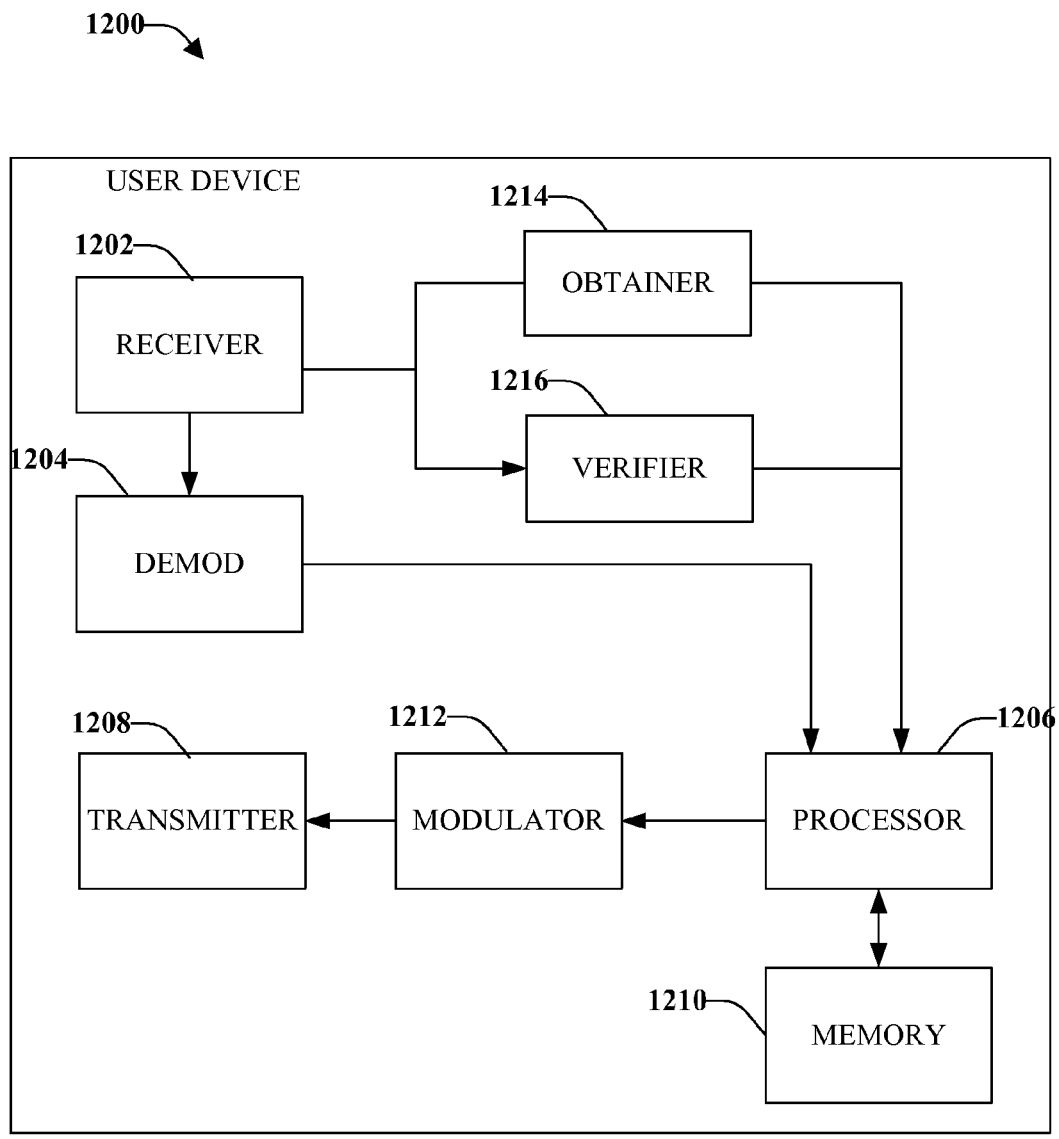
FIG. 12 illustrates a system that facilitates validating stored and/or incoming messages in accordance with one or more of the disclosed aspects.

With reference now to FIG. 12, illustrated is a system 1200 that facilitates validating stored and/or incoming messages in accordance with one or more of the disclosed aspects. System 1200 can reside in a user device. System 1200 comprises a receiver 1202 that can receive a signal from, for example, a receiver antenna. The receiver 1202 can perform typical actions thereon, such as filtering, amplifying, downconverting, etc. the received signal. The receiver 1202 can also digitize the conditioned signal to obtain samples. A demodulator 1204 can obtain received symbols for each symbol period, as well as provide received symbols to a processor 1206.

Processor 1206 can be a processor dedicated to analyzing information received by receiver component 1202 and/or generating information for transmission by a transmitter 1208. In addition or alternatively, processor 1206 can control one or more components of user device 1200, analyze information received by receiver 1202, generate information for transmission by transmitter 1208, and/or control one or more components of user device 1200. Processor 1206 may include a controller component capable of coordinating communications with additional user devices.

User device 1200 can additionally comprise memory 1208 operatively coupled to processor 1206 and that can store information related to coordinating communications and any other suitable information. Memory 1210 can additionally store protocols associated with sample rearrangement. It will be appreciated that the data store (e.g., memories) components described herein can be either volatile memory or non-volatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1208 of the subject systems and/or methods is intended to comprise, without being limited to, these and any other suitable types of memory. User device 1200 can further comprise a symbol modulator 1212 and a transmitter 1208 that transmits the modulated signal.

Receiver 1202 is further operatively coupled to an obtainer 1214 that can be configured to obtain new scrambling information. In accordance with some aspects, the scrambling information can be obtained from one source, wherein the retained unreadable message is obtained from a different source. If the demodulator 1204 cannot successfully demodulate (e.g., read) a received message, the message, or the unsuccessfully read bits can be retained in memory 1210. At substantially the same time as obtaining the new scrambling information, demodulator 1204 can attempt to re-read the saved message and/or bits. A verifier 1216 can be configured to determine, based on the re-read attempt with the obtained scrambling information, whether the packet was previously not able to be demodulated based on a scrambling information change or based on a reason not related to the scrambling information change (e.g., jamming, environmental fading effects).

Figure 13:
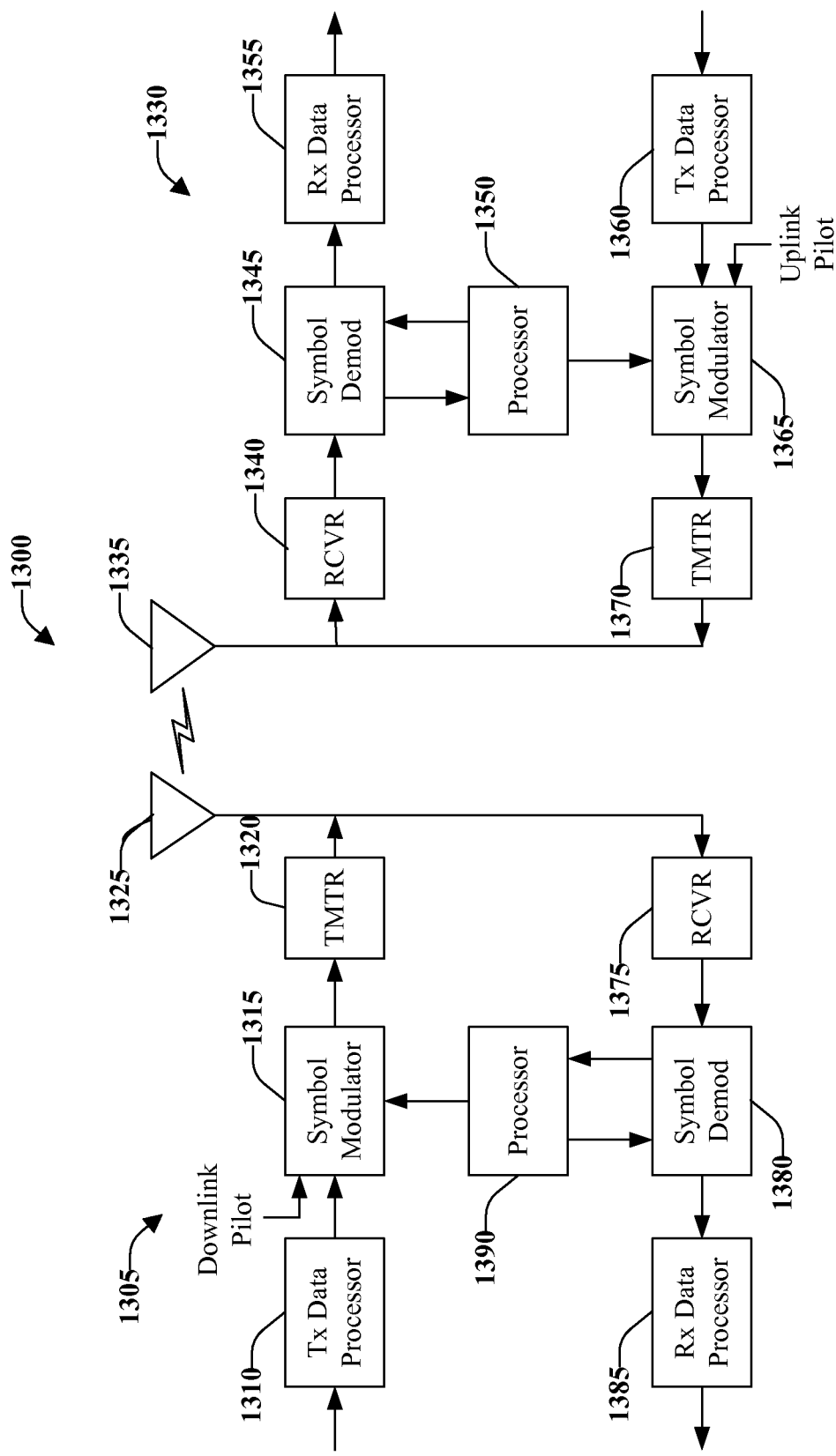
FIG. 13 illustrates an exemplary wireless communication system.

FIG. 13 illustrates an exemplary wireless communication system 1300. Wireless communication system 1300 depicts one base station and one terminal for sake of brevity. However, it is to be appreciated that system 1300 can include more than one base station or access point and/or more than one terminal or user device, wherein additional base stations and/or terminals can be substantially similar or different from the exemplary base station and terminal described below. In addition, it is to be appreciated that the base station and/or the terminal can employ the systems and/or methods described herein to facilitate wireless communication there between.

Referring now to FIG. 13, on a downlink, at access point 1305, a transmit (TX) data processor 1310 receives, formats, codes, interleaves, and modulates (or symbol maps) traffic data and provides modulation symbols ("data symbols"). A symbol modulator 1315 receives and processes the data symbols and pilot symbols and provides a stream of symbols. A symbol modulator 1315 multiplexes data and pilot symbols and obtains a set of N transmit symbols. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

A transmitter unit (TMTR) 1320 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1325 to the terminals. At terminal 1330, an antenna 1335 receives the downlink signal and provides a received signal to a receiver unit (RCVR) 1340. Receiver unit 1340 conditions (e.g., filters, amplifies, and frequency downconverts) the received signal and digitizes the conditioned signal to obtain samples. A symbol demodulator 1345 obtains N received symbols and provides received pilot symbols to a processor 1350 for channel estimation. Symbol demodulator 1345 further receives a frequency response estimate for the downlink from processor 1350, performs data demodulation on the received data symbols to obtain data symbol estimates (which are estimates of the transmitted data symbols), and provides the data symbol estimates to an RX data processor 1355, which demodulates (i.e., symbol demaps), deinterleaves, and decodes the data symbol estimates to recover the transmitted traffic data. The processing by symbol demodulator 1345 and RX data processor 1355 is complementary to the processing by symbol modulator 1315 and TX data processor 1310, respectively, at access point 1305.

On the uplink, a TX data processor 1360 processes traffic data and provides data symbols. A symbol modulator 1365 receives and multiplexes the data symbols with pilot symbols, performs modulation, and provides a stream of symbols. A transmitter unit 1370 then receives and processes the stream of symbols to generate an uplink signal, which is transmitted by the antenna 1335 to the access point 1305.

At access point 1305, the uplink signal from terminal 1330 is received by the antenna 1325 and processed by a receiver unit 1375 to obtain samples. A symbol demodulator 1380 then processes the samples and provides received pilot symbols and data symbol estimates for the uplink. An RX data processor 1385 processes the data symbol estimates to recover the traffic data transmitted by terminal 1330. A processor 1390 performs channel estimation for each active terminal transmitting on the uplink.

Processors 1390 and 1350 direct (e.g., control, coordinate, manage, . . . ) operation at access point 1305 and terminal 1330, respectively. Respective processors 1390 and 1350 can be associated with memory units (not shown) that store program codes and data. Processors 1390 and 1350 can also perform computations to derive frequency and impulse response estimates for the uplink and downlink, respectively.

For a multiple-access system (e.g., FDMA, OFDMA, CDMA, TDMA, and the like), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1390 and 1350.

Figure 14:
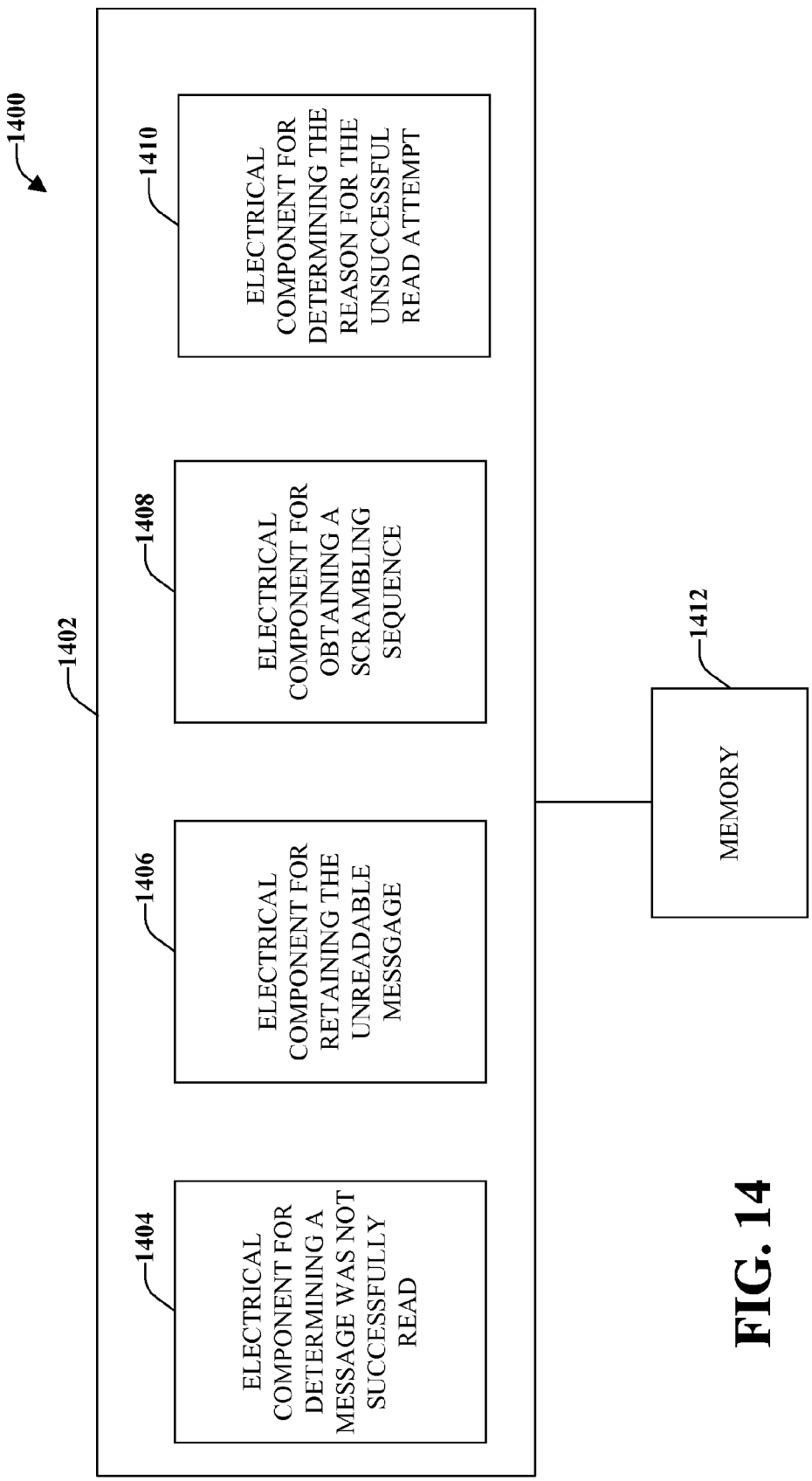
FIG. 14 illustrates an example system that validates stored and/or incoming overhead messages.

With reference to FIG. 14, illustrated is an example system 1400 that validates stored and/or incoming messages. System 1400 can reside at least partially within a mobile device. It is to be appreciated that system 1400 is represented as including functional blocks, which may be functional blocks that represent functions implemented by a processor, software, or combination thereof (e.g., firmware).

System 1400 includes a logical grouping 1402 of electrical components that can act separately or in conjunction. Logical grouping 1402 can include an electrical component for determining that a message was not successfully read after a first attempt 1404. Further, logical grouping 1402 can comprise an electrical component for retaining the unreadable message 1406. For example, the unreadable message can be retained in system memory. Moreover, logical grouping 1402 can include an electrical component for obtaining a scrambling information 1408. In accordance with some aspects, the scrambling information can be obtained from a first source, wherein the retained unreadable message is a from a second source.

Electrical component for determining that a message was not successfully read after a first attempt 1204 can attempt to re-read the saved message with the recently obtained scrambling information. An electrical component for ascertaining why the message was not successfully read on the first attempt 1410 can be included in logical grouping 1402. The message might not have been read due to a scrambling information change or a reason not related to the scrambling information change. In accordance with some aspects, it can be ascertained that the message was not successfully read after the first attempt due to a scrambling information change if the second attempt to re-read the message is successful. In accordance with other aspects, it can be ascertained that the message was not successfully read after the first reading attempt due to a reason other than a signature information check if the re-read attempt with the original signature information (e.g., the signature information used for the first read attempt) is successful. According to some aspects, the previously unreadable message is validated if the re-read attempt is successful.

Additionally, system 1400 can include a memory 1412 that retains instructions for executing functions associated with electrical components 1404, 1406, 1408, and 1410 or other components. While shown as being external to memory 1412, it is to be understood that one or more of electrical components 1404, 1406, 1408, and 1410 may exist within memory 1412.

It is to be understood that the aspects described herein may be implemented by hardware, software, firmware, middleware, microcode, or any combination thereof. When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art. Further, at least one processor may include one or more modules operable to perform the functions described herein.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM□, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

While the foregoing disclosure discusses illustrative aspects and/or aspects, it should be noted that various changes and modifications could be made herein without departing from the scope of the described aspects and/or aspects as defined by the appended claims. Accordingly, the described aspects are intended to embrace all such alterations, modifications and variations that fall within scope of the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description of the claims is meant to be a "non-exclusive or".

What is claimed is:

1. A method for validating stored or incoming messages, comprising:

determining, by a decoder of a mobile device, that a message was not successfully read after a first attempt, wherein the message was attempted to be read in the first attempt using first scrambling information;

retaining the message as unreadable in a cache of the mobile device;

obtaining second scrambling information related to the retained message at a scrambling information acquirer of the mobile device;

attempting, by the decoder, to re-read the retained message with the second scrambling information from the cache;

determining, by a message verifier of the mobile device, whether the attempt to re-read the retained message with the second scrambling information is successful; and if the attempt to re-read the retained message with the second scrambling information is successful, then determining, by the message verifier, that the first attempt was not successful because of a scrambling information change, and otherwise determining that the first attempt was not successful due to a reason different from the scrambling information change, wherein it is ascertained that the message was not successfully read after the first attempt due to the reason different from the scrambling information change if an attempt to re-read the retained message succeeds with the first scrambling information.

2. The method of claim 1, wherein the unreadable message is validated if the re-read attempt is successful.

3. The method of claim 1, wherein the second scrambling information is obtained from a first source, and wherein the retained unreadable message is a different source.

4. A wireless communications apparatus, comprising:

a memory that retains instructions related to determining that a message was not successfully read after a first attempt, wherein the message was attempted to be read in the first attempt using first scrambling information, retaining the message as unreadable in a cache, obtaining second scrambling information related to the retained message, attempting to re-read the retained message with the second scrambling information from the cache, determining whether the attempt to re-read the retained message with the second scrambling information is successful, and if the attempt to re-read the retained message with the second scrambling information is successful, then determining that the first attempt was not successful because of a scrambling information change, and otherwise determining that the first attempt was not successful due to a reason not related to the scrambling information change, wherein the message was not successfully read after the first attempt due to the reason not related to the scrambling information change if an attempt to re-read the retained message succeeds with the first scrambling information; and a processor, coupled to the memory, configured to execute the instructions retained in the memory.

5. The wireless communications apparatus of claim 4, wherein the unreadable message is validated if the re-read attempt is successful.

6. The wireless communications apparatus of claim 4, wherein the second scrambling information is obtained from a first source, and wherein the retained unreadable message is a different source.

7. A wireless communications apparatus that facilitates validation of messages, comprising:

means for determining that a message was not successfully read after a first attempt, wherein the message was attempted to be read in the first attempt using first scrambling information;

means for retaining the message as unreadable in a cache;

means for obtaining second scrambling information related to the retained message;

means for attempting to re-read the retained message with the second scrambling information from the cache;

means for determining whether the attempt to re-read the retained message with the second scrambling information is successful; and means for determining that the first attempt was not successful because of a scrambling information change if the attempt to re-read the retained message with the second scrambling information is successful, and for otherwise determining that the first attempt was not successful due to a reason different from the scrambling information change, wherein the message was not successfully read after the first attempt due to the reason different from the scrambling information change if an attempt to re-read the retained message succeeds with the first scrambling information.

8. The wireless communications apparatus of claim 7, wherein the unreadable message is validated if the re-read attempt is successful.

9. The wireless communications apparatus of claim 7, wherein the second scrambling information is obtained from a first source, and wherein the retained unreadable message is a different source.

10. A non-transitory machine-readable medium having stored thereon machine-executable instructions for validation of messages, comprising:

determining that a message was not successfully read after a first attempt, wherein the message was attempted to be read in the first attempt using first scrambling information;

retaining the message as unreadable in a cache;

obtaining second scrambling information related to the retained message;

attempting to re-read the retained message with the second scrambling information from the cache;

determining whether the attempt to re-read the retained message with the second scrambling information is successful; and if the attempt to re-read the retained message with the second scrambling information is successful, then determining that the first attempt was not successful because of a scrambling information change, and otherwise determining that the first attempt was not successful due to a reason different from the scrambling information change, wherein the instructions further comprise determining that the message was not successfully read after the first attempt due to a reason different from the scrambling information change if an attempt to re-read the retained message succeeds with the first scrambling information.

11. The non-transitory machine-readable medium of claim 10, wherein the unreadable message is validated if the re-read attempt is successful.

12. The non-transitory machine-readable medium of claim 10, wherein the second scrambling information is obtained from a first source, and wherein the retained unreadable message is a different source.

13. At least one processor for validating messages, comprising:

a computing device;

a first module operable to determine that a message was not successfully read after a first attempt, wherein the message was attempted to be read in the first attempt using first scrambling information;

a second module operable to retain the message as unreadable in a cache;

a third module operable to obtain second scrambling information related to the retained message;

a fourth module operable to attempt to re-read the retained message with the second scrambling information from the cache; and a fifth module operable to determine whether the attempt to re-read the retained message with the second scrambling information is successful and if the attempt to re-read the retained message with the second scrambling information is successful, then determine that the first attempt was not successful because of a scrambling information change, and otherwise determine that the first attempt was not successful due to a reason not related to the scrambling information change, wherein it is ascertained that the message was not successfully read after the first attempt due to a reason not related to the scrambling information change if an attempt to re-read the retained message succeeds with the first scrambling information.

* * * * *